Aug. 5, 1958  U. U. SAVOLAINEN  2,846,059
DEMONSTRATION DEVICE
Filed Sept. 6, 1957  2 Sheets-Sheet 1

Inventor,
Unto U. Savolainen,
by William W. Sattow Jr.
Atty.

Aug. 5, 1958 — U. U. SAVOLAINEN — 2,846,059
DEMONSTRATION DEVICE
Filed Sept. 6, 1957 — 2 Sheets-Sheet 2
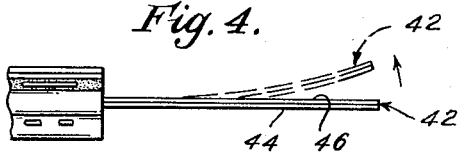
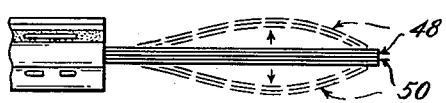
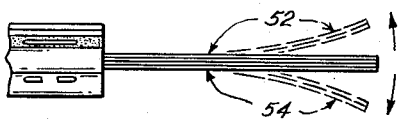
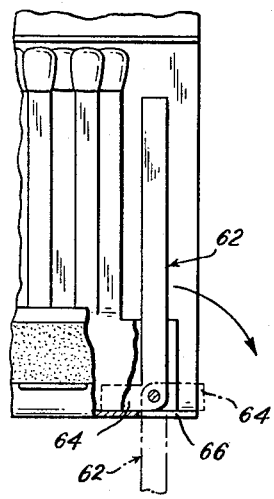
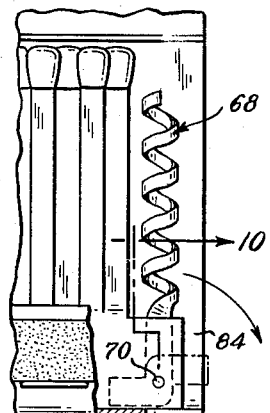
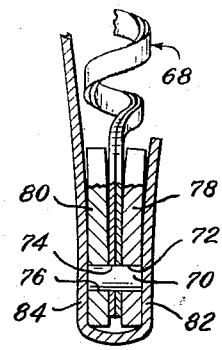
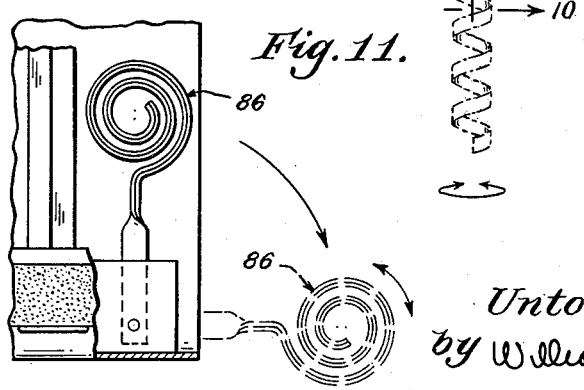
Inventor,
Unto U. Savolainen,
by William W. Dolton Jr.
Att'y.

United States Patent Office 2,846,059
Patented Aug. 5, 1958

2,846,059

DEMONSTRATION DEVICE

Unto U. Savolainen, Attleboro, Mass., assignor to Metals & Controls Corporation, Attleboro, Mass., a corporation of Massachusetts Application September 6, 1957, Serial No. 682,369

4 Claims. (Cl. 206—29)

This invention relates to a demonstration device, and more particularly, to a device for demonstrating the action of a thermally responsive member.

An object of this invention is to provide a novel device for demonstrating the action of a thermally responsive member. A further object of this invention is to provide such a device which is self-contained.

A further object of this invention is to provide a safe, convenient, economical means for demonstrating a thermally responsive member.

Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Figs. 4-7 are fragmentary views taken in the direction of Fig. 3 and showing various kinds of thermally responsive members, the action of which can be demonstrated with the device of this invention;

Fig. 8 is a fragmentary, front, elevational view showing a modified form of this invention;

Fig. 9 is a view similar to Fig. 8 but showing still another form of thermally responsive member which can be demonstrated with the device of this invention;

Fig. 10 is a fragmentary sectional view taken along lines 10, 10 in Fig. 9; and

Fig. 11 is a view similar to Fig. 9 and shows yet another form of thermally responsive member which can be demonstrated with the device of this invention.

Figure 1:
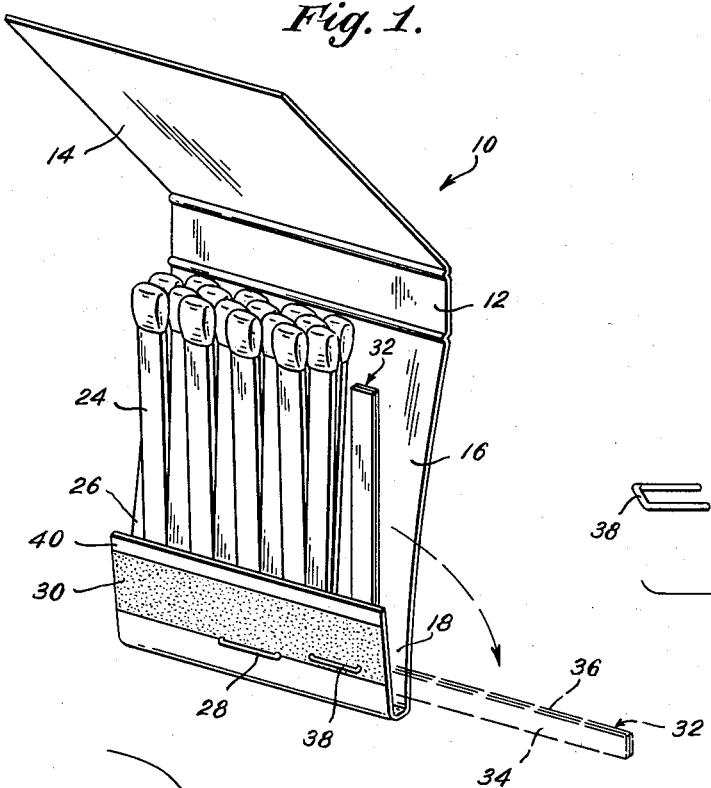
Fig. 1 is a perspective view of a device according to a first embodiment of this invention.

Referring to Fig. 1, there is illustrated a demonstration device according to one embodiment of this invention which is generally indicated by the numeral 10. This device includes a folding match book cover 12 having a front panel 14, a rear panel 16 and a generally U-shaped section 18 at one end portion thereof. The base 20, 22 of one or more combs 24, 26, respectively, of matches is at least partially disposed within and fastened to the U-shaped section 18 by any suitable means such as a staple 28. An abrasive strip may be provided at any convenient location on the match book cover as, for example, at 30 as indicated in Fig. 1.

Also included in the demonstration device of this invention is a thermally responsive member which, in the embodiment illustrated in Fig. 1, takes the form of a composite strip 32. Composite strip 32 is formed of two layers firmly bonded together, the front layer 34 as viewed in Fig. 1 being formed of a material having a comparatively high coefficient of expansion (often referred to as the "high expansion side") and the rear layer 36 having a comparatively low coefficient of expansion (often referred to as the "low expansion side"). By way of example, a member 32 may be provided by a 0.005 inch thick strip of material designated as P675R and sold under the registered trademark "Truflex" by Metals & Controls Corporation, Attleboro, Massachusetts, U. S. A.

Figure 2:
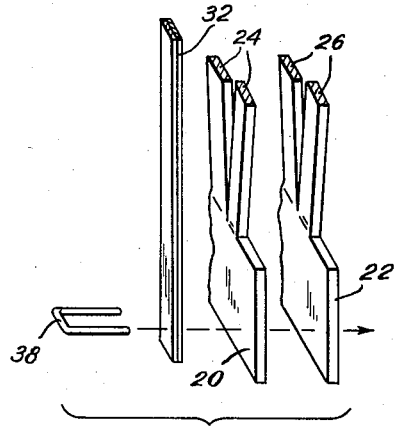
Fig. 2 is an exploded, fragmentary, perspective view illustrating the manner in which the thermally responsive member may be fastened to one or more combs of matches according to this embodiment.
Figure 3:
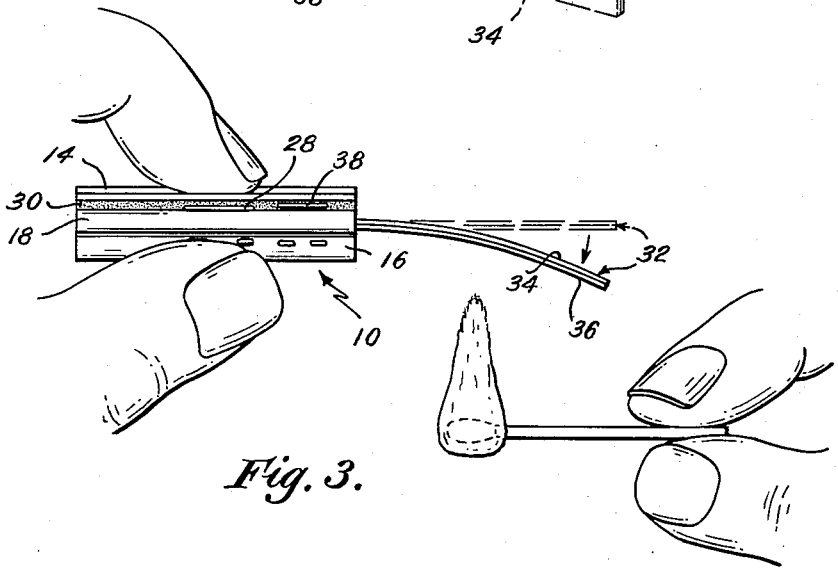
Fig. 3 is a pictorial view illustrating the manner in which the device of the invention may be used to demonstrate the action of a thermally responsive member.

Thermally responsive member 32 is mounted for pivotal movement about one end portion thereof to and away from the position shown in full lines in Fig. 1 at which member 32 lies adjacent the matches provided by combs 24 and 26. Thermally responsive member 32, in the full-line position shown in Fig. 1, lies substantially parallel with and adjacent to the matches provided by combs 24 and 26 and is pivotally mounted for movement through substantially 90° to the broken-line position shown in this figure. The pivotal mounting for thermally responsive member 32 may take any one of a number of different forms, this mounting taking the form in the embodiment of Figs. 1–3, of a staple 38. Staple 38 may be driven, as shown in Figs. 1–3, through the front flap 40 of U-shaped section 18, through the end portion of member 32, through bases 20 and 22 of combs 24 and 26, respectively, and then through rear panel 16. It will be noted, of course, that only one of the legs of staple 38 passes through thermally responsive member 32 and that the spacing between the two legs of staple 38 is sufficiently great to permit pivotal movement of member 32 relative to the staple. If desired, the thermally responsive member and/or bases 20, 22 could be provided with a preformed hole for the reception of one of the legs of the staple before the latter is applied. Also, it will be clear that the thermally responsive member could as well be pivotally mounted between bases 20 and 22 or between rear panel 16 and the adjacent base.

Ordinarily, the demonstration device of this invention is carried about in one's pocket or purse with the thermally responsive member 32 in the full-line position shown in Fig. 1, with cover 12 in closed position encasing the match combs and thermally responsive member, and with the distal end of front panel 14 disposed between front flap 40 of the match book cover and the base 20 of comb of matches 24. In operation, front flap 40 may be opened to substantially the position shown in Fig. 1, thermally responsive member 32 pivoted from the position shown in full lines to the position shown in broken lines, one of the matches removed from the match book, and the match cover 12 then returned to the above-described closed position. The removed match may then be struck and lighted by drawing it against abrasive surface 30, and then, as depicted in Fig. 3, the heat from the lighted match may be applied to the thermally responsive element 32. The high expansion side 34 of thermally responsive member 32 being uppermost as viewed in Fig. 3, the latter will bow or flex in the downward direction from the position shown in broken lines toward the position shown in full lines. When the match flame is removed, the thermally responsive strip 32 will gradually cool and return to the broken-line position shown in Fig. 3. Thermally responsive member 32 may then be pivoted to the full-line position adjacent and substantially parallel with the matches contained in the match book shown in Fig. 1 without the necessity for opening and then closing the match book cover.

Fig. 4 illustrates the action of a thermally responsive member 42 identical with member 32 of the embodiment of Figs. 1–3 except that the high expansion side 44 thereof is on the lowermost side of the thermally responsive member as viewed in Fig. 4. The low expansion side 46 will then, of course, be uppermost as viewed in Fig. 4, and, upon the application of the heat of a lighted match, the thermally responsive member will bow upwardly in the direction toward the broken-line position of the element as shown in Fig. 4. Figs. 5 and 6 illustrate the resulting action when the heat of one of the matches is applied to two side-by-side thermally responsive members 48, 50 and 52, 54, respectively. The low expansion sides of thermally responsive members 48 and 50 face each other, and the high expansion sides of thermally responsive members 52 and 54 face each other. Fig. 7 illustrates the action when the heat of a match is applied to a thermally responsive member 56 formed of two butt welded sections 58 and 60, section 58 having its high expansion side uppermost and section 60 having its low expansion side uppermost all as viewed in this figure.

Fig. 8 shows a modification of the embodiment of Figs. 1–3 in that the pivoted end of the thermally responsive member 62 is provided with an inwardly extending, right-angle extension 64. It will be apparent that in pivoting thermally responsive member 62 from the position shown in broken lines to the position shown in full lines in Fig. 8, extension 64 will come into engagement with the yoke of the U-shaped section of the match book cover when the thermally responsive member reaches the full-line position shown in Fig. 8. The result is an added safety feature which prevents the thermally responsive member 62, which may retain some heat immediately after the thermally responsive member has been heated, from coming into engagement with the adjacent portion of the next adjacent match. Also, according to the modification of Fig. 8, the outer portion of the U-shaped section adjacent the thermally responsive member 62 is cut away or relieved at 66 to permit the thermally responsive member to be pivoted 180° from the full-line position shown in this figure.

The embodiment shown in Fig. 9 is substantially identical with that shown in Fig. 8 except that the thermally responsive member 68 is provided in the form of a helix. In this form, thermally responsive member 68 exhibits a rotational action (as depicted by the arrows in this figure) upon the application of the heat of a lighted match thereto. The respective direction of rotation is dependent, of course, upon whether the high expansion side is outermost or not.

Fig. 10 illustrates an alternative form of pivotal mounting means for the thermally responsive member 68, which alternative form is shown applied to the embodiment of Fig. 8 and which, of course, could be substituted for that of the embodiment of Figs. 1–3 as well as those of Figs. 4–7. This alternative form of pivotal mounting means takes the form of a pin 70 which may be formed of a short length of wire. Pin 70 passes, in interfitting relationship and in succession, through apertures 72, 74 and 76 provided by the base of comb 78, thermally responsive member 68 and the base of comb 80, respectively. The opposite ends of pin 70 abut the wall of front flap 82 (which corresponds to flap 40 of the embodiment of Fig. 1) and rear panel 84 whereby the pin 70 is retained in the position shown in Fig. 10.

The embodiment of Fig. 11 is similar to that of Figs. 1–3, except that the thermally responsive member 86 is in the form of a spiral. Upon the application of heat to thermally responsive member 86 the latter exhibits rotational action in the directions of the arrows in this figure, the respective direction depending upon whether the high expansion side or the low expansion side is disposed radially outermost.

It will be clear that the features of providing a right angle extension 64 and cut-away portion 66 as depicted in Figs. 8 and 9 are fully capable of being incorporated in the embodiments of Figs. 4–7 and 11, respectively.

It will be noted that the upper end of the thermally responsive member (as viewed, for example, in Fig. 1) of each of the embodiments shown in the drawings terminates short of the height of the head of each of the matches of that respective device. This construction provides the safety feature of preventing the possibility of movement of the thermally responsive member, which may not have cooled substantially following heating thereof, into engagement with an adjacent match head.

Among the features of this invention are those that a safe, practical, economical, convenient and novel device is provided for demonstrating a thermally responsive member, and that means for heating the thermally responsive member and the latter are self-contained in a convenient package.

Proportions and dimensions of certain of the parts have been modified in the drawings for the purpose of clarity of illustration.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. In combination, a comb of matches, a match book cover folded upon itself adjacent one end to form a U-shaped section, at least a portion of the base of said comb lying within said U-shaped section, a thermally responsive member formed of composite material including at least two layers, the coefficient of thermal expansion of one of said layers being greater than that of the other layer whereby the thermally responsive member is adapted to flex upon the application thereto of the heat of a lighted match, a fastening member passing through said base and through an end portion of said member pivotally to mount said member for movement to and away from a position adjacent said matches.

2. The combination as set forth in claim 1 wherein the yoke of said U-shaped section is cut away adjacent the pivotal mounting for said thermally responsive member to permit pivotal movement of the latter substantially 180° from said position.

3. The device as set forth in claim 1 wherein the distal end of said thermally responsive member, in said one position, terminates short of the heads of said matches.

4. A folding match book cover encasing a comb of headed matches; a thermally responsive member formed of composite material including at least two layers; the coefficient of thermal expansion of one of said layers being greater than that of the other layer whereby the thermally responsive member is adapted to flex under the application of the heat of a lighted match; said thermally responsive member being pivotally mounted adjacent one end thereof for movement between two positions; said member, in one of said positions, lying adjacent to and substantially parallel with said matches and, in said second position, having its distal end pivoted away from close proximity with said matches; and the pivoted end of said thermally responsive member carrying a laterally extending extension engageable with said cover to prevent movement of the thermally responsive member into engagement with any of said matches.

References Cited in the file of this patent

UNITED STATES PATENTS

| | | |
|---|---|---|
| 1,992,219 | Klopsteg | Feb. 26, 1935 |
| 2,026,684 | Johansson | Jan. 7, 1936 |
| 2,445,317 | Duval | July 20, 1948 |
| 2,539,249 | Holland | Jan. 23, 1951 |
| 2,798,595 | Lieberman | July 9, 1957 |